No. 31,552.  
T. J. MAYALL.  
HOSE.  
PATENTED FEB. 26, 1861.
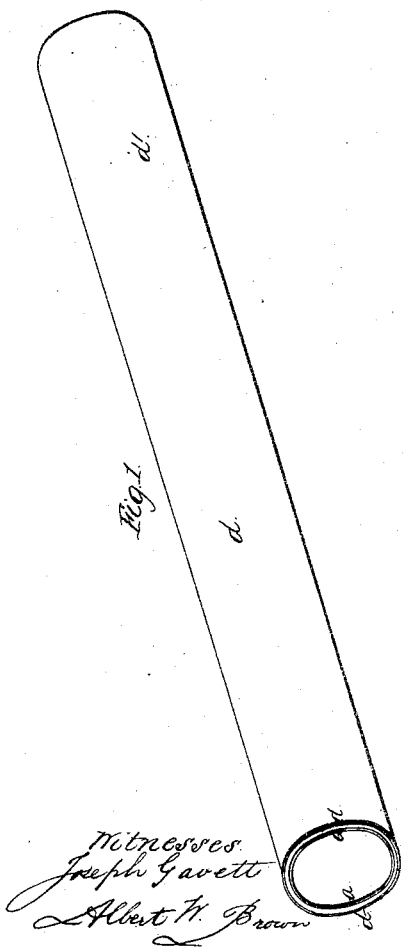
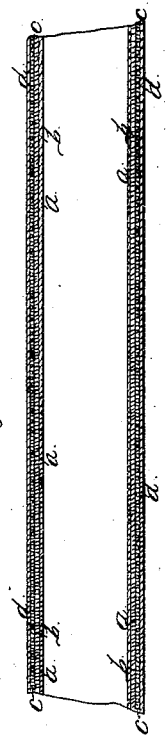
Witnesses  
Joseph Gavett  
Albert W. Brown
Inventor  
Thos. J. Mayall

UNITED STATES PATENT OFFICE.

THOMAS J. MAYALL, OF ROXBURY, MASSACHUSETTS.

CAOUTCHOUC HOSE-TUBING.

Specification of Letters Patent No. 31,552, dated February 26, 1861.

*To all whom it may concern:*

Be it known that I, THOMAS J. MAYALL, of Roxbury, in the county of Norfolk and State of Massachusetts, have invented certain new and useful Improvements in the Manufacture of Hose or Tubing, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The ordinary india rubber or gutta-percha hose is formed usually of sheets of cloth coated with india-rubber or gutta-percha wound around a mandrel and then vulcanized. Another kind of hose is made by winding the sheets of cotton or other cloth covered with a vulcanizable compound of india rubber or gutta percha spirally upon a mandrel of the same size of the required bore of the hose. Another kind of hose is formed of a seamless woven tube composed of fibrous materials and lined with a coating or tube of india rubber or gutta-percha. In these and the various other kinds of rubber or gutta-percha hose the most serious difficulty to be overcome has been that sufficient strength to resist a great pressure could not be obtained without making the hose too bulky and clumsy.

After many experiments I have produced a hose which combines lightness with great strength and the essential feature of my improvements consists in winding a tube of rubber or gutta-percha or a tube composed of fibrous materials and coated with an india-rubber or gutta-percha cement or other water-proof lining, with twine, wire or other suitable thread of sufficient fineness closely around the periphery of the same. The outer surface thus formed of twine, thread or wire tightly binds and holds the tube which it incloses and thereby gives the said tube great strength where it is most needed to resist the pressure of fluids, viz., in a transverse direction. The great strength thus imparted to the hose will be manifest from the fact that the threads or strands will receive all strains and pressures longitudinally or in the direction of the length of the fibers in which direction they can sustain the greatest force without breaking.

One form of my new hose is represented in the accompanying drawings of which—

Figure 1 is a perspective view, Fig. 2 is a longitudinal section and Fig. 3 is a transverse section.

I do not confine myself to the precise form or construction of hose represented as these can be very much varied it being only essential that any suitable tube should be so closely and tightly wound with strands of twine, thread or wire, as to achieve the purposes of my invention, viz: the obtaining of great strength to resist transverse pressures.

One convenient mode of preparing my improved hose, I will now proceed to describe in detail. I take a mandrel of suitable size for the required bore of the hose, slip over the same a tube or lining of india rubber or gutta-percha $a$ $a$ formed in any proper manner. Over this is drawn a woven tube $b$ $b$ of fibrous materials which is then coated with any suitable rubber or other cement. The whole is then wound by hand or machinery with strands of thread, twine or wire $c$ $c$ $c$ closely and tightly around the same, so as to form a close and firm surface of the said strands thereon. If desired this surface may be covered with a coating of a suitable cement or with an outer tube $d$ $d$ of rubber or gutta-percha. In lieu of the woven tube $b$ $b$ and the lining $a$ $a$, sheets of cotton or other material coated with rubber or gutta-percha may be wrapped, either in a straight or a spiral direction around the mandrel and then wound with the strands as before explained. The whole may then be vulcanized while upon the mandrel, in any of the various well-known modes, or not as may be desired. Another and simpler mode is to place a tube of rubber or gutta-percha upon a mandrel and then wind the strands upon the periphery of the same. The whole can then be covered, if desired, with a coating of cement or with an outer tube of rubber or gutta-percha as before.

Having thus described my improvements, what I claim as my invention and desire to have secured to me by Letters Patent is—

A hose or tubing in which the periphery of one or more of its layers is formed by winding upon an inner tube or lining strands of thread, twine, wire &c. substantially as herein above set forth.

THOS. J. MAYALL.

Witnesses:
JOSEPH GAVETT,
ALBERT W. BROWN.